United States Patent
Tan et al.

(10) Patent No.: US 12,550,001 B2
(45) Date of Patent: Feb. 10, 2026

(54) SYSTEMS AND METHODS FOR LOAD BALANCING CONNECTIONS FOR COLLABORATION NETWORKING

(71) Applicant: Dell Products, L.P., Round Rock, TX (US)

(72) Inventors: Danilo O. Tan, Austin, TX (US); Harpreet Narula, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 235 days.

(21) Appl. No.: 18/468,970

(22) Filed: Sep. 18, 2023

(65) Prior Publication Data

US 2025/0097769 A1   Mar. 20, 2025

(51) Int. Cl.
*H04W 28/08* (2023.01)
*H04L 67/104* (2022.01)
*H04W 28/02* (2009.01)
*H04W 48/16* (2009.01)

(52) U.S. Cl.
CPC ......... *H04W 28/08* (2013.01); *H04L 67/1046* (2013.01); *H04W 28/021* (2013.01); *H04W 48/16* (2013.01)

(58) Field of Classification Search
CPC ... H04W 28/08; H04W 28/021; H04W 48/16; H04W 84/12; H04W 24/02; H04W 28/0289; H04W 28/0284; H04W 28/0247; H04W 28/0226; H04W 48/06; H04W 48/04; H04W 52/0212; H04W 72/52; H04W 92/18; H04W 40/24; H04W 64/00; H04W 84/20; H04W 72/0446; H04W 16/08; H04W 36/0016; H04W 40/22; H04W 28/0865; H04W 28/0231; H04W 40/20; H04W 24/08; H04L 67/1046; H04L 47/20; H04L 43/0882; H04L 43/08; H04L 41/12
See application file for complete search history.

(56) References Cited

U.S. PATENT DOCUMENTS

2017/0180210 A1* 6/2017 Lisouski ............... H04L 45/123
2017/0290069 A1* 10/2017 Weizman ............. H04W 8/005
2021/0352565 A1* 11/2021 Li ........................ H04L 41/0894

* cited by examiner

*Primary Examiner* — Diane D Mizrahi
*Assistant Examiner* — Jing Gao
(74) *Attorney, Agent, or Firm* — Fogarty LLP (57) ABSTRACT

Systems and methods for load balancing connections for collaboration networking are described. In an illustrative, non-limiting embodiment, a first Information Handling System (IHS) may include: a processor; and a memory coupled to the processor, where the memory includes program instructions store thereon that, upon execution by the processor, cause the first IHS to: establish at least one peer-to-peer (P2P) connection with at least a second IHS of a P2P network; obtain a request to join the P2P network from a third IHS while the P2P network is configured with a first P2P network topology; and direct the third IHS to join the P2P network, where, at least after the join, the P2P network is configured with a second P2P network topology.

20 Claims, 7 Drawing Sheets

SYSTEMS AND METHODS FOR LOAD BALANCING CONNECTIONS FOR COLLABORATION NETWORKING

FIELD

This disclosure relates generally to Information Handling Systems (IHSs), and more specifically, to systems and methods for load balancing connections for collaboration networking.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

Peer-to-peer ("P2P") computing or networking is a distributed application architecture that partitions tasks or workloads between peers. Peers are equally privileged, equipotent participants in the network. They are said to form a peer-to-peer network of nodes. Peers make a portion of their resources, such as processing power, disk storage or network bandwidth, directly available to other network participants, without the need for central coordination by servers or stable hosts. Peers are both suppliers and consumers of resources, in contrast to the traditional client-server model in which the consumption and supply of resources are divided.

A peer-to-peer network is designed around the notion of equal peer nodes simultaneously functioning as both "clients" and "servers" to the other nodes on the network. This model of network arrangement differs from the client-server model where communication is usually to and from a central server. A typical example of a file transfer that uses the client-server model is the File Transfer Protocol ("FTP") service in which the client and server programs are distinct: the clients initiate the transfer, and the servers satisfy these requests.

Peer-to-peer networks generally implement some form of virtual overlay network on top of the physical network topology, where the nodes in the overlay form a subset of the nodes in the physical network. Data is still exchanged directly over the underlying TCP/IP network, but at the application layer peers are able to communicate with each other directly, via the logical overlay links (each of which corresponds to a path through the underlying physical network). Overlays are used for indexing and peer discovery, and make the P2P system independent from the physical network topology. Based on how the nodes are linked to each other within the overlay network, and how resources are indexed and located, we can classify networks as unstructured or structured (or as a hybrid between the two).

SUMMARY

Systems and methods for load balancing connections for collaboration networking are described. In an illustrative, non-limiting embodiment, a first Information Handling System (IHS) may include: a processor; and a memory coupled to the processor, where the memory includes program instructions store thereon that, upon execution by the processor, cause the first IHS to: establish at least one peer-to-peer (P2P) connection with at least a second IHS of a P2P network; obtain a request to join the P2P network from a third IHS while the P2P network is configured with a first P2P network topology; and direct the third IHS to join the P2P network, where, after the join, the P2P network is configured with a second P2P network topology.

In some embodiments, the P2P network includes a plurality of Wi-Fi Direct connections. In some embodiments, the first IHS is configured as a host of a first group of client IHSs in the first and second P2P network topologies, where the second IHS is configured as a satellite host of a second group of client IHSs in the first P2P network topology, and where the second IHS is configured as a satellite host of a third group of client IHSs in the second P2P network topology.

In some embodiments, the program instructions, upon execution by the processor, further cause the first IHS to: obtain audio streams from individual IHSs of the first group of client IHSs; and merge audio streams from the first IHS and the first group of client IHSs into a first combined audio stream, where the second IHS is configured to merge audio streams from the second IHS and the second group of client IHSs into a second combined audio stream in the first P2P network topology, and where the second IHS is configured to merge audio streams from the second IHS and the third group of client IHSs into the second combined audio stream in the second P2P network topology.

In some embodiments, the program instructions, upon execution by the processor, further cause the first IHS to: merge the first combined audio stream and the second combined audio stream into a third combined audio stream; and provide the third combined audio stream to a connected remote location. In some of these embodiments, the program instructions, upon execution by the processor, further cause the first IHS to: provide the first combined audio stream to a station or access point, where the station or access point merges the first combined audio stream and the second combined audio stream into a third combined audio stream that is provided to a remote location.

In some embodiments, to direct the third IHS to join the P2P network, the program instructions, upon execution by the processor, further cause the first IHS to: determine that a first count of P2P connected devices of the first group of client IHSs associated with the host has reached a threshold; determine that a second count of P2P connected devices of the second group of client IHSs associated with the satellite host has not reached the threshold; and direct the third IHS to connect to the second IHS, configured as the satellite host, and join the second group of client IHSs as an additional client, where the second group of client IHSs becomes the third group of client IHSs after the third IHS joins.

In some embodiments, the first IHS is configured as a host of a first group of client IHSs in the first P2P network topology, where prior to directing the third IHS to join the P2P network, the program instructions, upon execution by the processor, further cause the first IHS to: restructure the first P2P network topology into the second P2P network topology to accommodate the third IHS.

In some embodiments, the first group of client IHSs includes the second IHS, where to restructure the first P2P network topology into the second P2P network topology, the program instructions, upon execution by the processor, further cause the first IHS to: determine that count of P2P connected devices of the first group of client IHSs associated with the host has reached a threshold; direct the second IHS to become a satellite host of a second group of client IHSs; and where to direct the third IHS to join the P2P network, the program instructions, upon execution by the processor, further cause the first IHS to: direct the third IHS to connect to the second IHS as the satellite host, and join the second group of client IHSs as an additional client.

In some embodiments, after directing the second IHS to become the satellite host of the second group of client IHSs, the first group of client IHSs does not include the second IHS, where the program instructions, upon execution by the processor, further cause the first IHS to: obtain audio streams from individual IHSs of the first group of client IHSs; merge audio streams from the first IHS and the first group of client IHSs into a first combined audio stream. In some embodiments, the first IHS is configured as a host of a first group of client IHSs, where the second IHS is configured as a satellite host of a second group of client IHSs, and where the first group of client IHSs use a different frequency channel for communication than the second group of client IHSs.

In some embodiments, the first IHS is configured as a host of a first group of client IHSs including the second IHS, where the program instructions, upon execution by the processor, further cause the first IHS to: determine that a count of P2P connected devices of the first group of client IHSs associated with the host has not reached a threshold; and advertise the P2P network, where the advertisement includes metadata indicating that there is an open slot for an additional client.

In another illustrative, non-limiting embodiment, a method includes: establishing, by a first Information Handling System (IHS), a peer-to-peer (P2P) connection with a second IHS of a P2P network, where the first IHS is configured as a host of the P2P connection; obtaining, by the first IHS, a request to join the P2P network from a third IHS; in response to the request, reconfiguring a topology of the P2P network to produce a reconfigured P2P network; and directing, by the first IHS, the third IHS to join the reconfigured P2P network.

In some embodiments, the first IHS is configured as the host of a first group of client IHSs in the P2P network and the reconfigured P2P network, the method further including: obtaining, by the first IHS, audio streams from individual IHSs of the first group of client IHSs; and merging audio streams from the first IHS and the first group of client IHSs into a first combined audio stream. In some embodiments, the first IHS is configured as the host of a first group of client IHSs in the P2P network and the reconfigured P2P network, where directing the third IHS to join the reconfigured P2P network further includes: determining that a first count of P2P connected devices of the first group of client IHSs has reached a threshold; determining that a second count of P2P connected devices of a second group of client IHSs associated with a satellite host has not reached the threshold; and directing the third IHS to connect to the satellite host, and join the second group of client IHSs as an additional client.

In some embodiments, the first IHS is configured as the host of a first group of client IHSs in the P2P network and the reconfigured P2P network, where the first group of client IHSs includes the second IHS, and where directing the third IHS to join the reconfigured P2P network further includes: determining that a count of P2P connected devices of the first group of client IHSs has reached a threshold; directing the second IHS to become a satellite host of a second group of client IHSs; and directing the third IHS to connect to the second IHS as the satellite host, and join the second group of client IHSs as a client.

In another illustrative, non-limiting embodiment, one or more non-transitory computer-readable storage media store program instructions, that when executed on or across one or more processors of a first Information Handling System (IHS), cause the first IHS to: establish a peer-to-peer (P2P) connection with a second IHS of a P2P network, where the first IHS is configured as a host of the P2P connection, and where the P2P network is configured in a first P2P network topology; obtain a request to join the P2P network from a third IHS; and direct the third IHS to join the P2P network, where the P2P network is configured in a second P2P network topology.

In some embodiments, the first IHS is configured as the host of a first group of client IHSs in the first and second P2P network topologies, where the program instructions further cause the first IHS to: obtain audio streams from the first IHS and individual IHSs of the first group of client IHSs; and merge audio streams from the first IHS and the first group of client IHSs into a first combined audio stream. In some embodiments, the first IHS is configured as the host of a first group of client IHSs in the first and second P2P network topologies, where to direct the third IHS to join the P2P network, the program instructions further cause the first IHS to: determine that a first count of P2P connected devices of the first group of client IHSs has reached a threshold; determine that a second count of P2P connected devices of a second group of client IHSs associated with a satellite host has not reached the threshold; and direct the third IHS to connect to the satellite host, and join the second group of client IHSs as an additional client.

In some embodiments, the first IHS is configured as the host of a first group of client IHSs in the first P2P network topology, where to direct the third IHS to join the P2P network, the program instructions further cause the first IHS to: determine that count of P2P connected devices of the first group of client IHSs associated with the host has reached a threshold; direct the second IHS to become a satellite host of a second group of client IHSs; and direct the third IHS to connect to the second IHS as the satellite host, and join the second group of client IHSs as a client.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
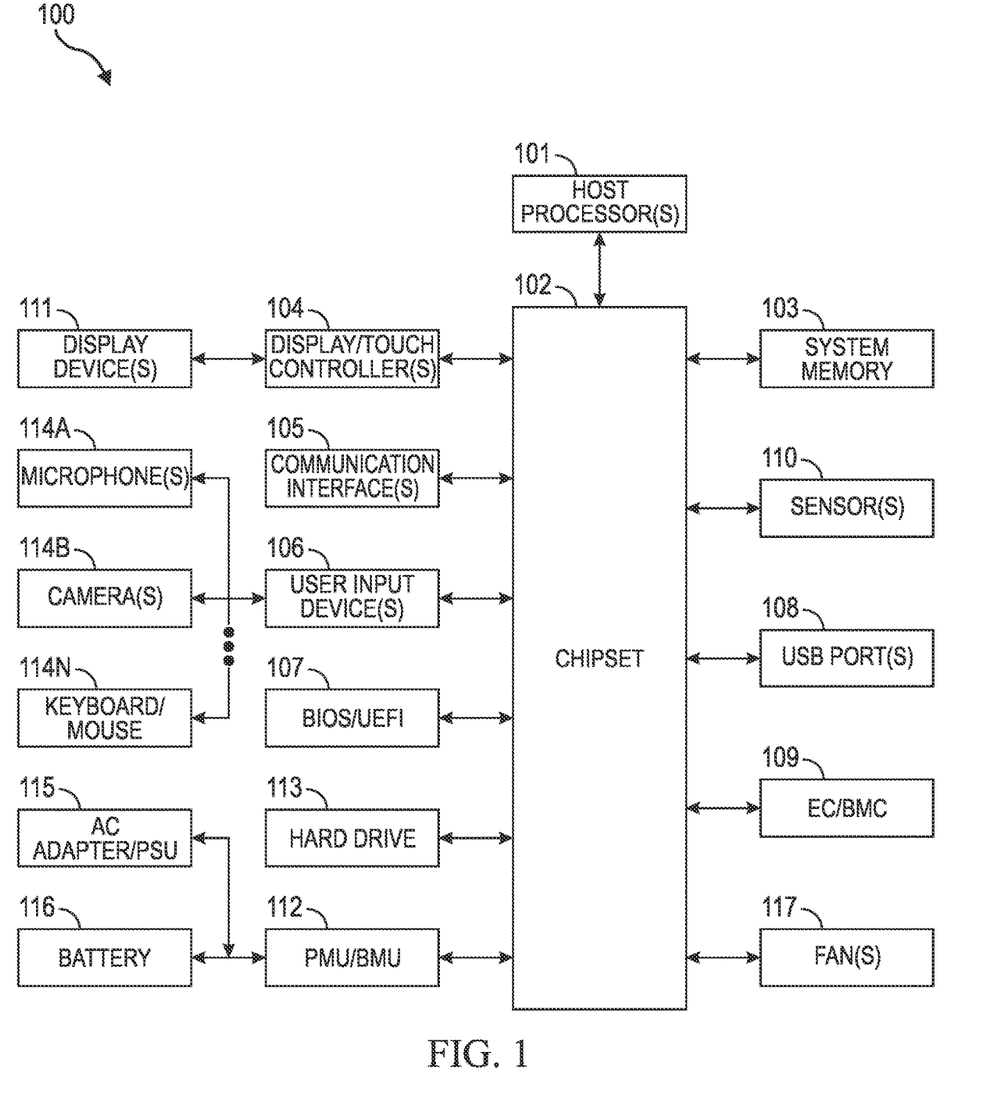
FIG. 1 is a diagram illustrating examples of hardware components of an Information Handling System (IHS), according to some embodiments.

FIG. 1 is a block diagram of hardware components of IHS 100, which may be used to implement load balancing connections for collaboration networking.

As depicted, IHS 100 includes host processor(s) 101. In various embodiments, IHS 100 may be a single-processor system, or a multi-processor system including two or more processors. Host processor(s) 101 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101.

Chipset 102 may also be coupled to communication interface(s) 105 to enable communications between IHS 100 and various wired and/or wireless networks, such as Ethernet, Wi-Fi, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like. Communication interface(s) 105 may also be used to communicate with certain peripherals devices (e.g., BT speakers, microphones, headsets, etc.). Moreover, communication interface(s) 105 may be coupled to chipset 102 via a Peripheral Component Interconnect Express (PCIe) bus, or the like.

Chipset 102 may be coupled to display/touch controller(s) 104, which may include one or more or Graphics Processor Units (GPUs) on a graphics bus, such as an Accelerated Graphics Port (AGP) or PCIe bus. As shown, display/touch controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be provided as a single continuous display, or as two or more discrete displays.

Chipset 102 may provide host processor(s) 101 and/or display/touch controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 102 may also provide host processor(s) 101 with access to one or more Universal Serial Bus (USB) ports 108, to which one or more peripheral devices may be coupled (e.g., integrated or external webcams, microphones, speakers, etc.).

Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc.

Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.)

In certain embodiments, chipset 102 may further provide an interface for communications with hardware sensors 110.

Sensors 110 may be disposed on or within the chassis of IHS 100, or otherwise coupled to IHS 100, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s).

Upon booting of IHS 100, host processor(s) 101 may utilize program instructions of Basic Input/Output System (BIOS) 107 to initialize and test hardware components coupled to IHS 100 and to load host OS 400 (FIG. 4) for use by IHS 100. BIOS 107 provides an abstraction layer that allows host OS 400 to interface with certain IHS components 100. Relying upon the hardware abstraction layer provided by BIOS 107, software stored in system memory 103 and executed by host processor(s) 101 can interface with certain I/O devices that are coupled to IHS 100.

The Unified Extensible Firmware Interface (UEFI) was designed as a successor to BIOS. As a result, many modern IHSs utilize UEFI in addition to or instead of a BIOS. As used herein, BIOS 107 is intended to also encompass a UEFI component.

Embedded Controller (EC) or Baseboard Management Controller (BMC) 109 is operational from the very start of each IHS power reset and handles various tasks not ordinarily handled by host processor(s) 101. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, ac, power, wireless LAN, sleep, etc.), managing PMU/BMU 112, alternating current (AC) adapter/Power Supply Unit (PSU) 115 and/or battery 116, allowing remote diagnostics and remediation over network(s) 103, etc.

For example, EC/BMC 109 may implement operations for interfacing with power adapter/PSU 115 in managing power for IHS 100. Such operations may be performed to determine the power status of IHS 100, such as whether IHS 100 is operating from AC adapter/PSU 115 and/or battery 116.

Firmware instructions utilized by EC/BMC 109 may also be used to provide various core operations of IHS 100, such as power management and management of certain modes of IHS 100 (e.g., turbo modes, maximum operating clock frequencies of certain components, etc.).

In addition, EC/BMC 109 may implement operations for detecting certain changes to the physical configuration or posture of IHS 100. For instance, when IHS 100 as a 2-in-1 laptop/tablet form factor, EC/BMC 109 may receive inputs from a lid position or hinge angle sensor 110, and it may use those inputs to determine: whether the two sides of IHS 100 have been latched together to a closed position or a tablet position, the magnitude of a hinge or lid angle, etc. In response to these changes, the EC may enable or disable certain features of IHS 100 (e.g., front or rear facing camera, etc.).

In some cases, EC/BMC 109 may be configured to identify any number of IHS postures, including, but not limited to: laptop, stand, tablet, tent, or book. For example, when display(s) 111 of IHS 100 is open with respect to a horizontal keyboard portion, and the keyboard is facing up, EC/BMC 109 may determine IHS 100 to be in a laptop posture. When display(s) 111 of IHS 100 is open with respect to the horizontal keyboard portion, but the keyboard is facing down (e.g., its keys are against the top surface of a table), EC/BMC 109 may determine IHS 100 to be in a stand posture.

When the back of display(s) 111 is closed against the back of the keyboard portion, EC/BMC 109 may determine IHS 100 to be in a tablet posture. When IHS 100 has two display(s) 111 open side-by-side, EC/BMC 109 may determine IHS 100 to be in a book posture. When IHS 100 has two displays open to form a triangular structure sitting on a horizontal surface, such that a hinge between the displays is at the top vertex of the triangle, EC/BMC 109 may determine IHS 100 to be in a tent posture. In some implementations, EC/BMC 109 may also determine if display(s) 111 of IHS 100 are in a landscape or portrait orientation.

In some cases, EC/BMC 109 may be installed as a Trusted Execution Environment (TEE) component to the motherboard of IHS 100.

Additionally, or alternatively, EC/BMC 109 may be configured to calculate hashes or signatures that uniquely identify individual components of IHS 100. In such scenarios, EC/BMC 109 may calculate a hash value based on the configuration of a hardware and/or software component coupled to IHS 100. For instance, EC/BMC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC/BMC 109 may later recalculate the hash value for a component may compare it against the reference hash value to determine if any modifications have been made to the component, thus indicating that the component has been compromised. In this manner, EC/BMC 109 may validate the integrity of hardware and software components installed in IHS 100.

In various embodiments, IHS 100 may be coupled to an external power source (e.g., AC outlet or mains) through AC adapter/PSU 115. AC adapter/PSU 115 may include an adapter portion having a central unit (e.g., a power brick, wall charger, or the like) configured to draw power from an AC outlet via a first electrical cord, convert the AC power to direct current (DC) power, and provide DC power to IHS 100 via a second electrical cord.

Additionally, or alternatively, AC adapter/PSU 115 may include an internal or external power supply portion (e.g., a switching power supply, etc.) connected to the second electrical cord and configured to convert AC to DC. AC adapter/PSU 115 may also supply a standby voltage, so that most of IHS 100 can be powered off after preparing for hibernation or shutdown, and powered back on by an event (e.g., remotely via wake-on-LAN, etc.). In general, AC adapter/PSU 115 may have any specific power rating, measured in volts or watts, and any suitable connectors.

IHS 100 may also include internal or external battery 116. Battery 116 may include, for example, a Lithium-ion or Li-ion rechargeable device capable of storing energy sufficient to power IHS 100 for an amount of time, depending upon the IHS's workloads, environmental conditions, etc. In some cases, a battery pack may also contain temperature sensors, voltage regulator circuits, voltage taps, and/or charge-state monitors.

Power Management Unit (PMU) 112 governs power functions of IHS 100, including AC adapter/PSU 115 and battery 116. For example, PMU 112 may be configured to: monitor power connections and battery charges, charge battery 116, control power to other components, devices, or ICs, shut down components when they are left idle, control sleep and power functions ("on" and "off"), manage interfaces for built-in keypad and touchpads, regulate real-time clocks (RTCs), etc.

In some implementations, PMU 112 may include one or more Power Management Integrated Circuits (PMICs) configured to control the flow and direction or electrical power in IHS 100. Particularly, a PMIC may be configured to perform battery management, power source selection, voltage regulation, voltage supervision, undervoltage protection, power sequencing, and/or charging operations. It may also include a DC-to-DC converter to allow dynamic voltage scaling, or the like.

Additionally, or alternatively, PMU 112 may include a Battery Management Unit (BMU) (referred to collectively as "PMU/BMU 112"). AC adapter/PSU 115 may be removably coupled to a battery charge controller within PMU/BMU 112 to provide IHS 100 with a source of DC power from battery cells within battery 116 (e.g., a lithium ion (Li-ion) or nickel metal hydride (NiMH) battery pack including one or more rechargeable batteries). PMU/BMU 112 may include non-volatile memory and it may be configured to collect and store battery status, charging, and discharging information, and to provide that information to other IHS components.

Examples of information collected and stored in a memory within PMU/BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and BMU events.

Examples of BMU events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, power draw measurements may be conducted with control and monitoring of power supply via PMU/BMU 112. Power draw data may also be monitored with respect to individual components or devices of IHS 100. Whenever applicable, PMU/BMU 112 may administer the execution of a power policy, or the like.

IHS 100 may also include one or more fans 117 configured to cool down one or more components or devices of IHS 100 disposed inside a chassis, case, or housing. Fan(s) 117 may include any fan inside, or attached to, IHS 100 and used for active cooling. Fan(s) 117 may be used to draw cooler air into the case from the outside, expel warm air from inside, and/or move air across a heat sink to cool a particular IHS component. In various embodiments, both axial and sometimes centrifugal (blower/squirrel-cage) fans may be used.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

For example, in various embodiments described herein, host processor(s) 101 and/or other components of IHS 100 (e.g., chipset 102, display/touch controller(s) 104, communication interface(s) 105, EC/BMC 109, etc.) may be replaced by discrete devices within a heterogenous computing platform (e.g., a System-On-Chip or "SoC"). As such, IHS 100 may assume different form factors including, but not limited to: servers, workstations, desktops, laptops, appliances, video game consoles, tablets, smartphones, etc.

Figure 2:
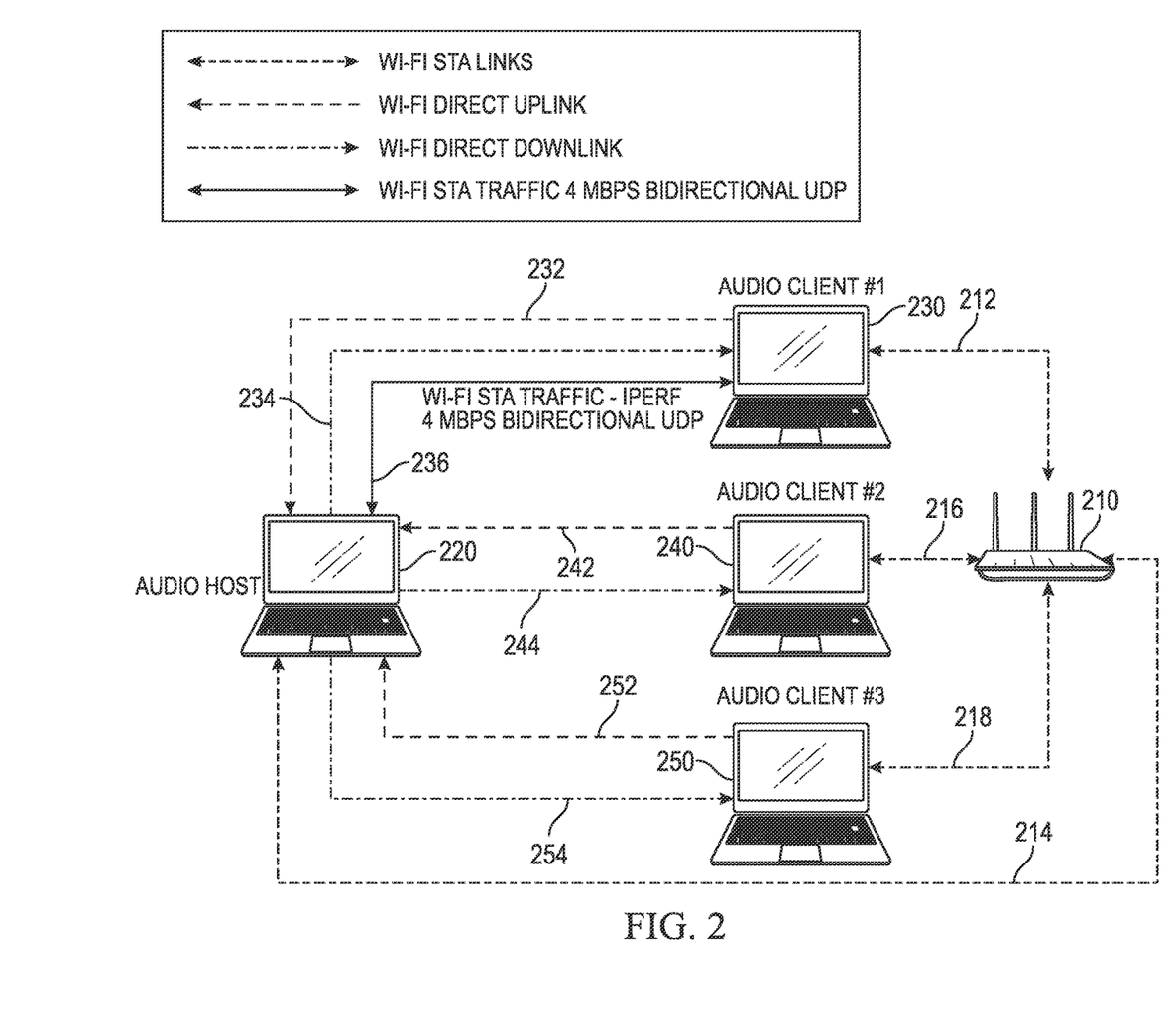
FIG. 2 is a diagram illustrating a use case for load balancing connections for collaboration networking, according to some embodiments.

FIG. 2 is a diagram illustrating a use case for load balancing connections for collaboration networking, according to some embodiments. This use case enhances a small collaboration room experience by leveraging microphone inputs from multiple client devices while an audio host acts as aggregator of voice from all microphones in the room. This first use case can be called "Audio Fusion" or "Conflux" in some embodiments. In FIG. 2, an Audio Host 220 is connected to 3 Audio Client devices (230, 240, 250). Each of the Client devices (230, 240, 250) can now use its own microphone to capture voice, and use its own speakers to playback audio, so each user can hear the conference voice without the need for conference equipment.

Each of the devices is connected to the Wi-Fi access point or station 210 using a conventional Wi-Fi connection. The audio host 220 is connected to the Wi-Fi access point or station 210 through conventional Wi-Fi connection 214. Likewise, audio client #1, audio client #2, and audio client #3 are connected to the Wi-Fi access point or station 210 through conventional Wi-Fi connections 212, 216, and 218, respectively.

Conventional Wi-Fi networks are typically based on the presence of controller devices known as wireless access points or stations. These devices normally combine three primary functions: (a) Physical support for wireless and wired networking; (b) Bridging and routing between devices on the network; and/or (c) Service provisioning to add and remove devices from the network. A typical Wi-Fi home network includes laptops, tablets and phones, devices like modern printers, music devices, and televisions. Most Wi-Fi networks are set up in infrastructure mode, where the access point acts as a central hub to which Wi-Fi capable devices are connected. All communication between devices goes through the access point in these networks.

However, in addition to the conventional Wi-Fi connections to the Wi-Fi access point or station 210, the audio host 220 is connected to each of the audio client devices (230, 240, 250) through separate Wi-Fi direct uplinks and downlinks, according to some embodiments. Wi-Fi Direct (formerly known as Wi-Fi Peer-to-Peer) is a Wi-Fi standard for peer-to-peer wireless connections that allows two devices to establish a direct Wi-Fi connection without an intermediary wireless access point, router, or Internet connection. Wi-Fi Direct is single-hop communication, rather than multi-hop communication like wireless ad hoc networks. Instead of leveraging the ad-hoc mode of operation, Wi-Fi Direct can build upon the successful IEEE 802.11 infrastructure mode and lets devices negotiate who will take over the AP-like functionalities, in some embodiments. Thus, legacy Wi-Fi devices can seamlessly connect to Wi-Fi Direct device, in some embodiments.

Wi-Fi Direct can be a way of communicating wirelessly, much like Bluetooth. It can be useful for everything from internet browsing to file transfer, and to communicate with one or more devices simultaneously at typical Wi-Fi speeds. One advantage of Wi-Fi Direct, in some embodiments, is the ability to connect devices even if they are from different manufacturers. In some embodiments, only one of the Wi-Fi devices needs to be compliant with Wi-Fi Direct to establish a peer-to-peer connection that transfers data directly between them with greatly reduced setup. Wi-Fi Direct can negotiate the link with a Wi-Fi Protected Setup system, in some embodiments, that assigns each device a limited wireless access point. The "pairing" of Wi-Fi Direct devices can be set up to require the proximity of a near field communication, a Bluetooth signal, or a button press on one or all the devices, depending on the embodiment.

In contrast to conventional Wi-Fi communication, Wi-Fi Direct devices can communicate with each other without requiring a dedicated wireless access point, in some embodiments. The Wi-Fi Direct devices can negotiate when they first connect to determine which device shall act as a host device. These roles are specified as dynamic, and hence a Wi-Fi Direct device has to implement both the role of a client and the role of a host (sometimes referred to as Soft-AP), in some embodiments. These roles are therefore logical roles that could even be executed simultaneously by the same device, for instance by time-sharing the channel through virtualization techniques. In order to establish a communication, then, the Wi-Fi devices have to agree on the role that each device will assume.

Wi-Fi Direct devices can communicate by establishing Groups, which can be functionally equivalent to traditional Wi-Fi infrastructure networks. The device implementing AP-like functionality in the Group can be referred to as the Group Host, and devices acting as clients can be known as Clients. Given that these roles are not static, when two P2P devices discover each other they negotiate their roles to establish a Group. Once the Group is established, other Clients can join the group as in a traditional Wi-Fi network.

Therefore, devices have first to discover each other, and then can negotiate which device will act as the host, in some embodiments. Wi-Fi Direct devices can usually start by performing a traditional Wi-Fi scan (active or passive), by means of which they can discover existent Groups and Wi-Fi networks. After this scan, a discovery algorithm can be executed. First, a device can select one of the so-called social channels, such as channels 1, 6, or 11 in the 2.4 GHz band, as its listen channel, in some embodiments. Then, it can alternate between two states: an advertisement state, in which the device performs active sending of Probe Requests in each of the social channels; and a scan state, in which the device listens for Probe Requests in its listen channel to respond with Probe Responses.

Once the two P2P Devices have found each other, they can start the negotiation phase. This can be implemented using a three-way handshake, namely a negotiation Request/Response/Confirmation, whereby the two devices agree on which device will act as a Host and on the channel where the group will operate, in some embodiments. The channel can be in the 2.4 GHz or 5 GHz bands, in some embodiments. Once the devices have discovered each other and agreed on the respective roles, the next phase is the establishment of a secure communication using Wi-Fi Protected Setup, which can be denoted as WPS Provisioning phase. Finally, a DHCP exchange to set up the IP configuration can occur.

Referring back to FIG. 2, the audio host 220 is connected to audio client #1 230 through Wi-Fi direct uplink 232, and Wi-Fi direct downlink 234. The audio host 220 is connected to audio client #2 240 through Wi-Fi direct uplink 242, and Wi-Fi direct downlink 244. The audio host 220 is connected to audio client #3 250 through Wi-Fi direct uplink 252, and Wi-Fi direct downlink 254. These uplinks (232, 242, 252) and downlinks (234, 244, 254) can be on the same Wi-Fi channel or a different Wi-Fi channel as the access point or station links (212, 214, 216, 218). In addition, each individual uplink (232, 242, 252) or downlink (234, 244, 254) might be on a same or different Wi-Fi channel as another uplink or downlink.

In some embodiments, the audio host 220 might be connected to a particular audio client device 230 through an iPerf 4 Mbps bi-directional UDP Wi-Fi station channel 236. iPerf can be a tool for network performance measurement and tuning. It can be a cross-platform tool that can produce standardized performance measurements for any network, in some embodiments. iPerf has client and server functionality, and can create data streams to measure the throughput between the two ends in one or both directions. Typical iPerf output contains a time-stamped report of the amount of data transferred and the throughput measured. The data streams can be either Transmission Control Protocol ("TCP") or User Datagram Protocol ("UDP"). When used for testing UDP capacity, iPerf allows the user to specify the datagram size and provides results for the datagram throughput and the packet loss.

Multiple latency sensitive collaboration and/or shared use cases like Audio Fusion or Conflux can be implemented using collaboration networking, such as peer-to-peer ("P2P") internetworking, in some embodiments, while also needing to maintain Internet traffic (e.g., through the conventional Wi-Fi connection to the station or access point). Solutions to maintain P2P internetworking along with Internet traffic can be implemented using Dual-Radio solutions like Dual Band Simultaneous (DBS) or Double Connect using Gfp4. However, unfortunately, dual-radio solutions are currently not adopted on most commercial and consumer platforms. However, collaboration and/or shared use cases still can be enabled, even without the use of a dual-radio.

Some multiple latency sensitive collaboration and/or shared use cases like Audio Fusion or Conflux, that can be implemented using collaboration networking such as peer-to-peer ("P2P") internetworking, can only handle a limited number of connections before latency issues occur due to serial nature of P2P connectivity required for a low latency connection. In some embodiments, these limited number of connections is only 4 connections. Therefore, a solution is required to scale the P2P collaboration experiences while still maintaining the local P2P internetworking.

Therefore, some embodiments of the present disclosure can load balance connections for collaboration networking by providing a software service running on the IHS which can automatically restructure a connection topology based on the number of participants. In addition, some embodiments of the present disclosure provide an audio driver that merges audio streams from Wi-Fi Direct connected clients as well as from Wi-Fi connected satellite hosts. Some of these embodiments can provide intelligent optimizations in connectivity based on key features, profiles, and usage models (e.g., contextual, security manageability, and/or traffic).

Some embodiments of the present disclosure can load balance connections for collaboration networking by using a multi-step process or method. First, a host can advertise the collaboration network, such as the Audio Fusion or Conflux service. Second, a participant might see the collaboration network and try to join. Third, if the Host does not have a slot, but a satellite host does, the host can redirect the new participant to the satellite host. Fourth, if the Host does not have a slot, and no satellite hosts have empty slots either, then the host can (a) direct one of the participants attached to host to become a new satellite host; and then (b) redirect the new participant to the newly created satellite host. Fifth, the new participant can connect to the satellite host provided by host. With this newly restructured connection topology, audio streams can now be processed by multiple hosts (main and satellites) to minimize latency issues, processing costs, and increase supported clients.

To further enhance performance, in some embodiments, satellite groups can choose a different frequency channel to reduce interference and latency of the connections. In addition, in some embodiments, a host and satellites can add metadata to their advertisements, indicating if there is an open slot, and then can stop advertising once its own slot are full. In addition, in some embodiments, Geo-fencing can be used to keep the groups isolated and close together.

Figure 3:
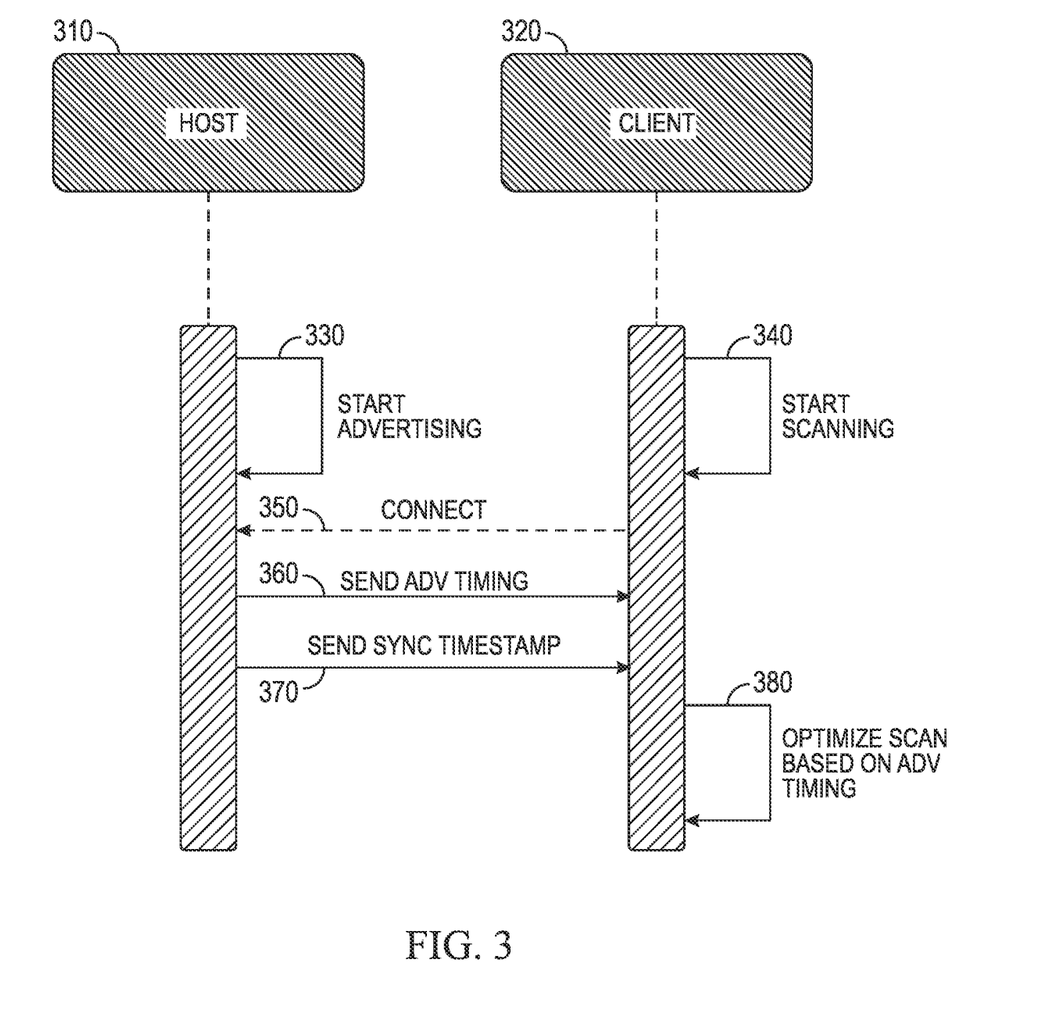
FIG. 3 illustrates an example sequence diagram of an embodiment for load balancing connections for collaboration networking, according to some embodiments.

FIG. 3 illustrates an example sequence diagram for some embodiments of load balancing connections for collaboration networking, according to some embodiments. In some embodiments, FIG. 3 may be instantiated, at least in part, through the execution of program instructions stored in system memory 103 and executed by host processor(s) 101 of IHS 100. FIG. 3 depicts that the client scan rate can be provided by the host upon connection (or at any time that the host changes its advertisement rate due to environmental changes). The timing can also be synchronized using the host's timestamp to further lower the scan time.

Contextual adaptive scheduling for Wi-Fi traffic management can encompass application adaptation, query/response rate adaptation, and/or channel adaptation, depending on the embodiment. Application Adaptation, in some embodiments, allows hosts to only advertise and allows clients to only scan for Wi-Fi Direct discovery. Most collaboration applications (e.g. Audio Fusion) are configured for the Host/Client model, where the Host device is responsible to establish the setup of the collaboration room. An IHS device configured as a Host device can be configured to only advertise for the other devices in the collaboration room, and doesn't necessarily need to scan, in some embodiments. IHS devices which would be client devices can be configured to scan only, and don't necessarily need to Advertise for P2P traffic, in some embodiments.

In addition, in some embodiments, both advertising and scanning can be turned off when certain conditions have been met, so as not to interfere with P2P data traffic or with general Internet traffic through the conventional Wi-Fi connection. As explained further below, an off adaptive scan configuration allows for better performance and packet latency, proving an effective means to control packet latency. For example, once a collaboration room has reached a maximum limit of connected devices, then advertising and scanning can be turned off. As another example, once a threshold of connected devices has been reached, then advertising and scanning can be turned off. As another example, once a predetermined number of connected devices has been reached, then advertising and scanning can be turned off.

A contextual adaptive scheduler for Wi-Fi traffic management can also encompass Query/Response rate adaptation, in some embodiments. Query/Response rate adaptation can adapt the Advertisement and Scan rate, respectively for the Host and Client devices, based on the application throughput needs and environmental conditions. In order to calculate a Scan/Advertisement rate, which is some embodiments might be an optimal scan/advertisement rate, the following can be used:

First, the max throughput needs for the application which is being used for collaboration can be determined. This can be pre-determined for the supported application, in some embodiments. Second, the resources (in bytes) allocated to a given station ("STA") and/or traffic identifier ("TID") can be determined, in some embodiments. In some embodiments this can be determined from common information/user information fields of a trigger frame. In some embodiments, the following formula can be used:

$$\text{Allocated Bytes} = \text{Rate in (Bits/(Seconds} * \text{Hz))} * \text{Bandwidth in Hz} * \text{Time in Seconds}/8$$

In the above formula the rate can be derived from the uplink ("UL") Modulation Coding Scheme ("MCS"), Dual Carrier Modulation ("DCM"), Guard Intervals ("GI") and/or Long Training Field ("LTF") Duration, in some embodiments. The Bandwidth can be determined from a Resource Unit ("RU") allocation. A RU can be a unit in OFDMA terminology used in 802.11 WLAN to denote a group of bandwidth subcarriers (tones) used in both DownLink ("DL") and UpLink ("UL") transmissions. With OFDMA, different transmit powers may be applied to different RUs. The RUs enables an Access Point ("AP") to allow WLAN stations to access it simultaneously and efficiently. The AP holds the RU allocation information for every peer Non-AP station associated with it. Finally, the time can be determined from the UL length, in some embodiments.

As a final step of calculating an advertisement and scan rate for Query/Response rate adaptation, the Scan/Advertisement/Sleep rate can be scaled as percentage of overall available time and channel bandwidth. In addition to performing the Query/Response rate adaptation as part of establishing a connection between a host and client, the Query/Response rate adaptation can also occur during run-time to allow for allocation of specific latency tuning while meeting user experience needs.

A contextual adaptive scheduler for Wi-Fi traffic management can also encompass channel adaptation, in some embodiments. A standard IHS framework of Wi-Fi drivers (e.g., Windows Driver Framework ("WDF")) can use the AP/STA channel for P2P traffic using Wi-Fi Direct. The channel is typically selected by the AP, but this selection doesn't include the impact of P2P traffic and its needs. Channel adaptation can determine a channel utilization using Wi-Fi signal analysis, in some embodiments. This might be built into a collaboration application, in some embodiments. Channel adaptation can be performed during the initial boot up process, in some embodiments, or triggered if packet error rate or Bit Error Rate is high during the application, in some embodiments. Channel selection can be performed for each location, where the location can be determined based on the Wi Fi network connection, in some embodiments. Once selected, a channel can be configured for the given session, in some embodiments. Configuration can be reapplied under a similar network and application context, in some embodiments.

Returning to FIG. 3, FIG. 3 begins with the host 310 starting to advertise 330 while the client 320 starts to scan 340. A Wi-Fi Direct connection 350 is then established. At 360, the host 310 sends advertising timing 360 to the client 320, which allows the client 320 to determine a client scan rate. This can also be provided any time that the host 310 changes its advertisement rate due to environmental changes. The host 310 then sends a synchronization timestamp 370 to the client 320, so that the timing of the host and client can be synchronized in order to further lower the scan time. At 380, the client 320 optimizes its scan rate and/or scan timing based on the received advertising timing, so that the client scans as the host is advertising.

Figure 4A:
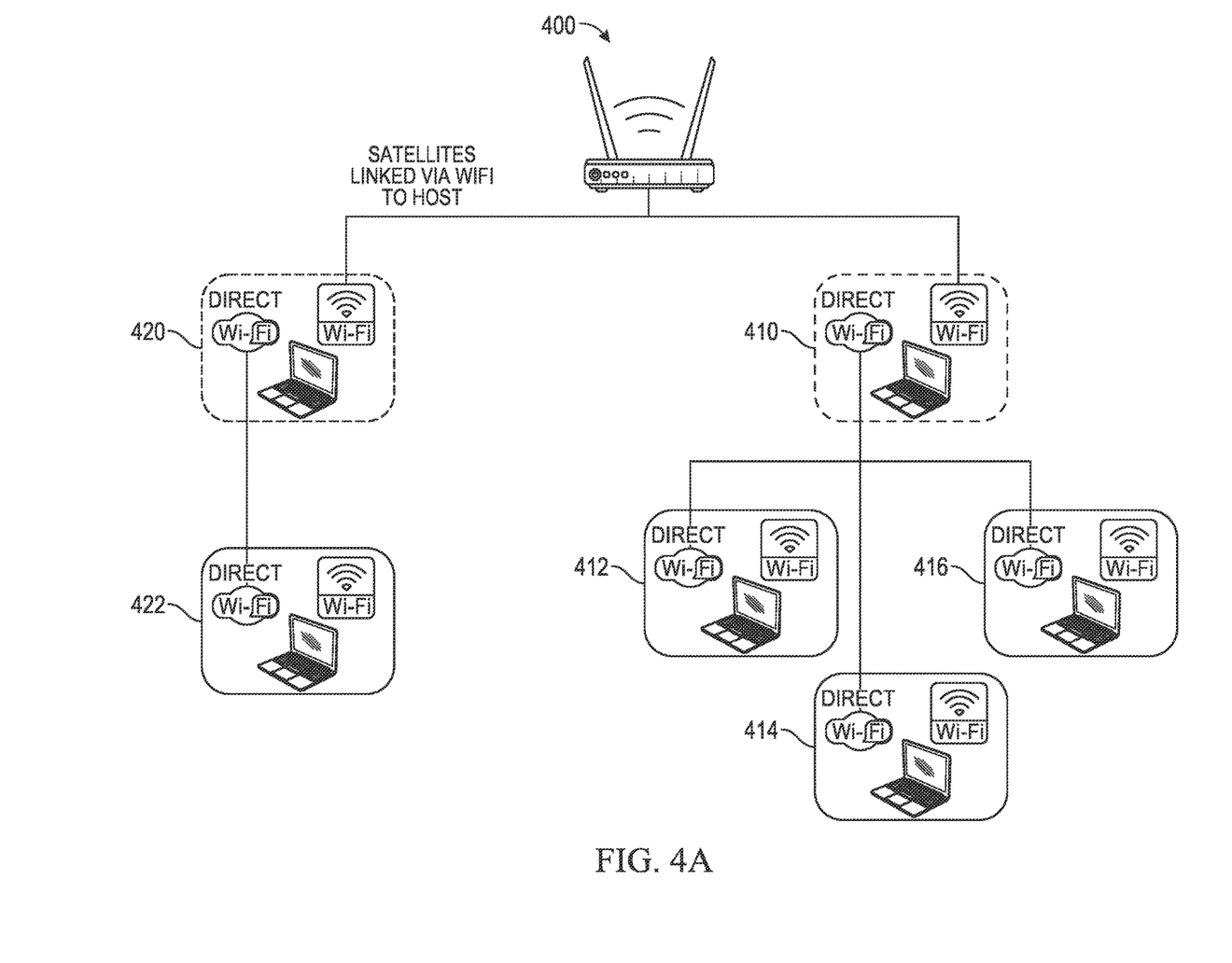
FIG. 4A is a diagram illustrating a first example of a collaboration network with a Wi-Fi Direct connected host, a Wi-Fi Direct connected satellite host, and Wi-Fi Direct connected clients, with a connection topology based on number of participants, according to some embodiments.

FIG. 4A is a diagram illustrating a first example of a collaboration network with a Wi-Fi Direct connected host 410, a Wi-Fi Direct connected satellite host 420, and Wi-Fi Direct connected clients (412, 414, 416, 422), with a connection topology based on number of participants, according to some embodiments. In FIG. 4A, Wi-Fi Direct host 410 has three clients in its group, including clients 412, 414, and 416. Wi-Fi Direct connected satellite host 420 has one connected client 422 in its satellite group. Wi-Fi Direct connected host 410 and the Wi-Fi Direct connected satellite host 420 are connected to the Wi-Fi access point or station 400.

Figure 4B:
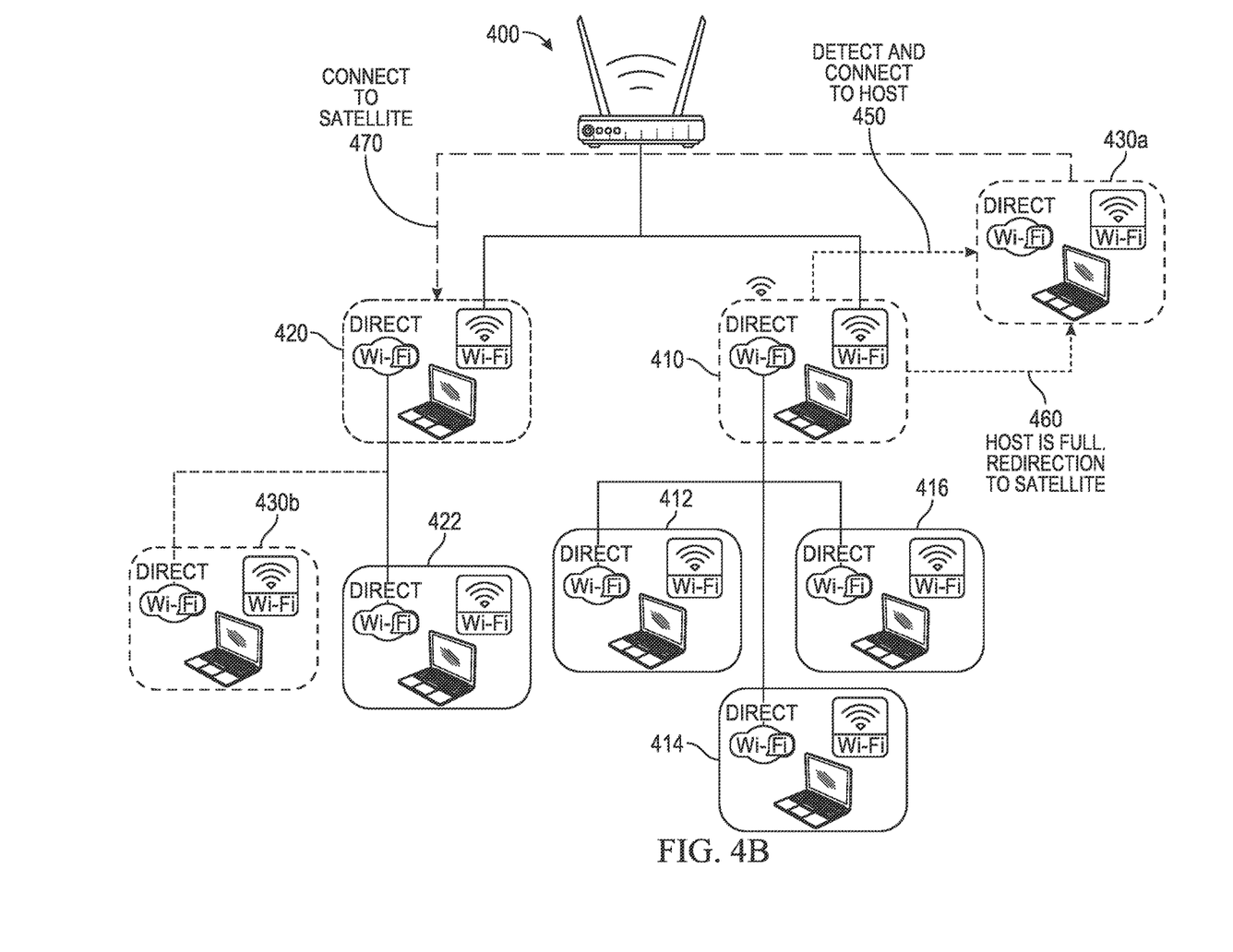
FIG. 4B is a diagram illustrating the first example of the collaboration network of FIG. 4A, where a new participant joins the collaboration network, and the collaboration network is restructured with a new connection topology based on the new number of participants, according to some embodiments.

FIG. 4B is a diagram illustrating the first example of the collaboration network of FIG. 4A, where a new participant 430a joins the collaboration network, and the collaboration network is restructured with a new connection topology based on the new number of participants, according to some embodiments. First, the host 410 broadcasts an advertisement for the collaboration network, such as a P2P network hosting an Audio Fusion or Conflux service. Second, the new participant 430a scans the Wi-Fi network, receives the advertisement for the collaboration network, and tries to join it (450). Third, the Host 410 does not have a slot in its own group, because its three open slots are occupied by clients 412, 414, and 416. However, the satellite host 420 does have a slot open in its group, since it only has once client 422. Therefore, the host 410 can redirect (460) the new participant 430a to the satellite host 420. Fourth, the new participant 430a can connect (470) to the satellite host 420 provided by host 410, and become a new client 430b to the satellite host 420. With this newly restructured connection topology, audio streams can now be processed by the multiple hosts (main 410 and satellite 420) to minimize latency issues, processing costs, and increase supported clients.

In some embodiments, an audio driver on the host 410 can merge audio streams from itself 410, its Wi-Fi Direct connected clients (412, 414, 416) as well as from Wi-Fi connected satellite host 420 into one audio stream that is presented to a remote location. In this case, the Wi-Fi connected satellite host 420 can also merge the audio streams from itself 420, and its clients (422, 430b), into one audio stream that is presented to the Wi-Fi connected host 410. Else, in other embodiments, an audio driver on the access point/station 400 can merge audio streams from the Wi-Fi connected host 410 as well as from Wi-Fi connected satellite host 420 into one audio stream that is presented to a remote location. In this case, the Wi-Fi connected host 410 can merge the audio streams from itself 410, and its clients (412, 414, 416), into one audio stream that is presented to the access point/station 400, and the Wi-Fi connected satellite host 420 can also merge the audio streams from itself 420, and its clients (422, 430b), into one audio stream that is presented to the access point/station 400.

Figure 5A:
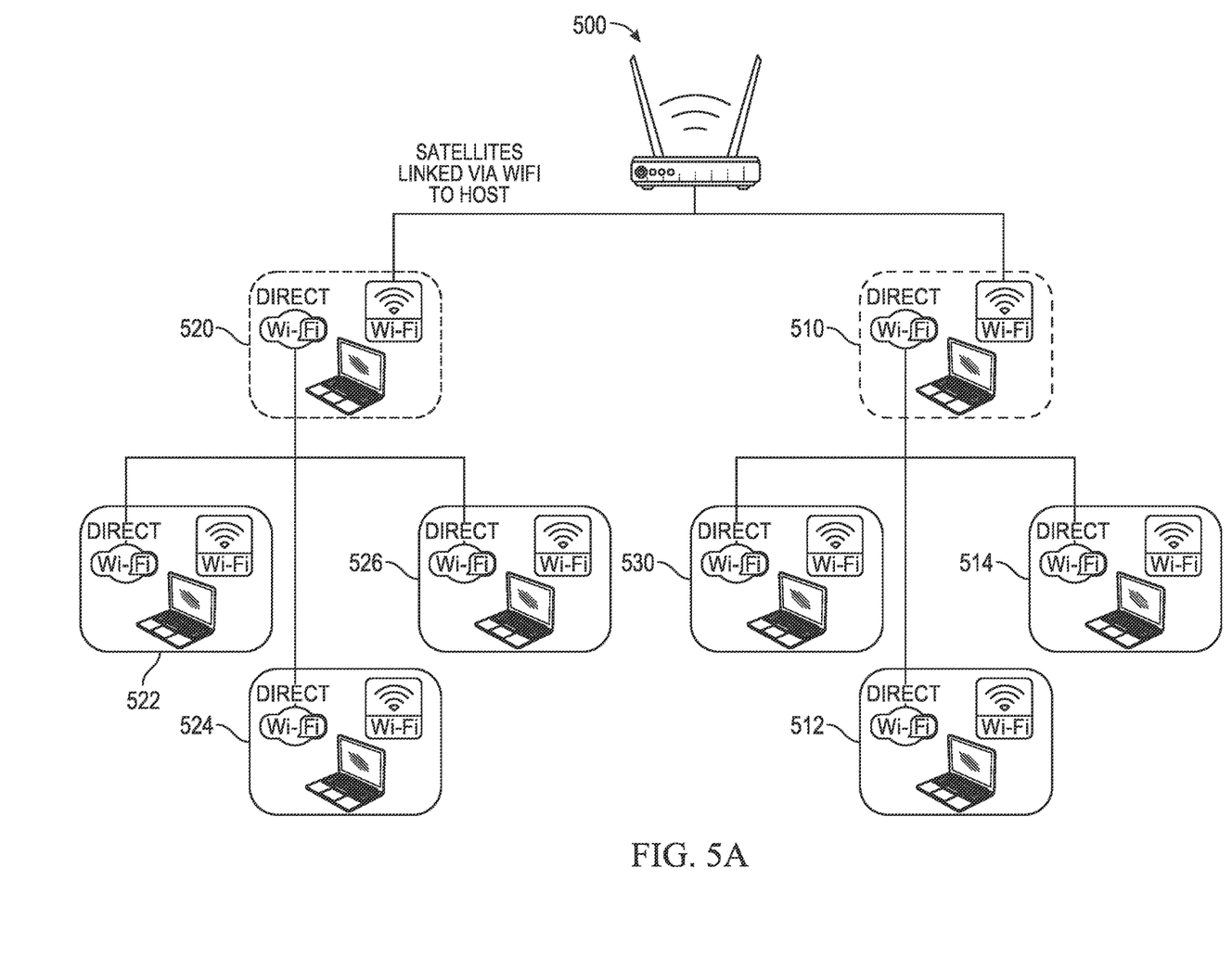
FIG. 5A is a diagram illustrating a second example of a collaboration network with a Wi-Fi Direct connected host, a Wi-Fi Direct connected satellite host, and Wi-Fi Direct connected clients, with a connection topology based on number of participants, according to some embodiments.

FIG. 5A is a diagram illustrating a second example of a collaboration network with a Wi-Fi Direct connected host 510, a Wi-Fi Direct connected satellite host 520, and Wi-Fi Direct connected clients (512, 514, 530, 522, 524, 526), with a connection topology based on number of participants, according to some embodiments. In FIG. 5A, Wi-Fi Direct host 510 has three clients in its group, including clients 512, 514, and 530. Wi-Fi Direct connected satellite host 520 has three clients in its satellite group, including clients 522, 524, and 526. Wi-Fi Direct connected host 510 and the Wi-Fi Direct connected satellite host 520 are connected to the Wi-Fi access point or station 500.

Figure 5B:
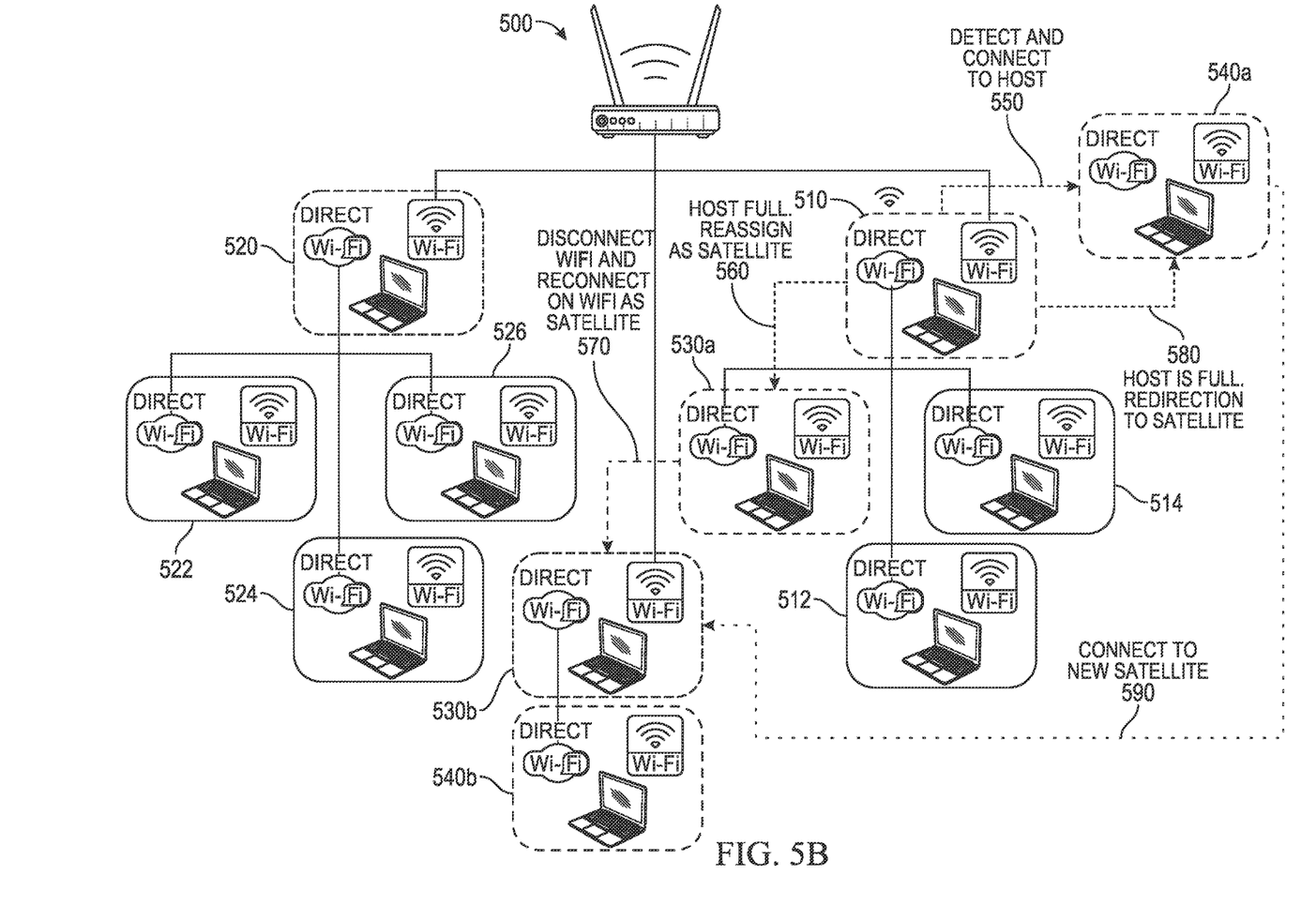
FIG. 5B is a diagram illustrating the second example of the collaboration network of FIG. 5A, where a new participant joins the collaboration network, and the collaboration network is restructured with a new connection topology based on the new number of participants, according to some embodiments.

FIG. 5B is a diagram illustrating the second example of the collaboration network of FIG. 5A, where a new participant 540a joins the collaboration network, and the collaboration network is restructured with a new connection topology based on the new number of participants, according to some embodiments. First, the host 510 broadcasts an advertisement for the collaboration network, such as a P2P network hosting an Audio Fusion or Conflux service. Second, the new participant 540a scans the Wi-Fi network, receives the advertisement for the collaboration network, and tries to join it (550). Third, the Host 510 does not have a slot in its own group, because its three open slots are occupied by clients 530, 512, and 514.

Fourth, no satellite hosts (520) have empty slots either, because the only Wi-Fi Direct connected satellite host 520 has its three slots occupied by clients 522, 524, and 526. Therefore, the host 510 can direct (560) one of the participants 530a attached to host 510 to become a new satellite host 530b. The Wi-Fi Direct connected client 530a can disconnect its Wi-Fi and then reconnect (570) on Wi-Fi as a satellite host 530b. The host 510 then redirect (580) the new participant 540a to the newly created satellite host 530b. Fifth, the new participant 540a can connect (590) to the satellite host 530b provided by host 510 as a Wi-Fi Direct connected client 540b of the Wi-Fi Direct connected satellite host 530b. With this newly restructured connection topology, audio streams can now be processed by multiple hosts (main 510 and satellites 520, 530b) to minimize latency issues, processing costs, and increase supported clients.

In some embodiments, an audio driver on the host 510 can merge audio streams from itself 510, its Wi-Fi Direct connected clients (512, 514), as well as from the Wi-Fi connected satellite hosts (520, 530b) into one audio stream that is presented to a remote location. In this case, the Wi-Fi connected satellite host 520 can merge the audio streams from itself 520, and its clients (522, 524, 526), into one audio stream that is presented to the Wi-Fi connected host 510, and the Wi-Fi connected satellite host 530b can also merge the audio streams from itself 530b, and its clients (540b), into one audio stream that is presented to the Wi-Fi connected host 510. Else, in other embodiments, an audio driver on the access point/station 500 can merge audio streams from the Wi-Fi connected host 510 as well as from Wi-Fi connected satellite hosts (520, 530b) into one audio stream that is presented to a remote location. In this case, the Wi-Fi connected host 510 can merge the audio streams from itself 510, and its clients (512, 514), into one audio stream that is presented to the access point/station 500; the Wi-Fi connected satellite host 520 can also merge the audio streams from itself 520, and its clients (522, 524, 526), into one audio stream that is presented to the access point/station 500; and the Wi-Fi connected satellite host 530b can also merge the audio streams from itself 530b, and its clients (540b), into one audio stream that is presented to the access point/station 500.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. A first Information Handling System (IHS), comprising:
   a processor; and
   a memory coupled to the processor, wherein the memory comprises program instructions stored thereon that, upon execution by the processor, cause the first IHS to:
      establish at least one peer-to-peer (P2P) connection with at least a second IHS of a P2P network;
      obtain a request to join the P2P network from a third IHS while the P2P network is configured with a first P2P network topology; and
      direct the third IHS to join the P2P network, wherein, at least after the join, the P2P network is configured with a second P2P network topology.

2. The IHS of claim 1, wherein the P2P network comprises a plurality of Wi-Fi Direct connections.

3. The IHS of claim 1, wherein the first IHS is configured as a host of a first group of client IHSs in the first and second P2P network topologies, wherein the second IHS is configured as a satellite host of a second group of client IHSs in the first P2P network topology, and wherein the second IHS is configured as a satellite host of a third group of client IHSs in the second P2P network topology.

4. The IHS of claim 3, wherein the program instructions, upon execution by the processor, further cause the first IHS to:
   obtain audio streams from individual IHSs of the first group of client IHSs; and
   merge audio streams from the first IHS and the first group of client IHSs into a first combined audio stream, wherein the second IHS is configured to merge audio streams from the second IHS and the second group of client IHSs into a second combined audio stream in the first P2P network topology, and wherein the second IHS is configured to merge audio streams from the second IHS and the third group of client IHSs into the second combined audio stream in the second P2P network topology.

5. The IHS of claim 4, wherein the program instructions, upon execution by the processor, further cause the first IHS to:
   merge the first combined audio stream and the second combined audio stream into a third combined audio stream; and
   provide the third combined audio stream to a connected remote location.

6. The IHS of claim 4, wherein the program instructions, upon execution by the processor, further cause the first IHS to:

provide the first combined audio stream to a station or access point, wherein the station or access point merges the first combined audio stream and the second combined audio stream into a third combined audio stream that is provided to a remote location.

7. The IHS of claim 3, wherein to direct the third IHS to join the P2P network, the program instructions, upon execution by the processor, further cause the first IHS to:
determine that a first count of P2P connected devices of the first group of client IHSs associated with the host has reached a threshold;
determine that a second count of P2P connected devices of the second group of client IHSs associated with the satellite host has not reached the threshold; and
direct the third IHS to connect to the second IHS, configured as the satellite host, and join the second group of client IHSs as an additional client, wherein the second group of client IHSs becomes the third group of client IHSs after the third IHS joins.

8. The IHS of claim 1, wherein the first IHS is configured as a host of a first group of client IHSs in the first P2P network topology, and wherein prior to directing the third IHS to join the P2P network, the program instructions, upon execution by the processor, further cause the first IHS to:
restructure the first P2P network topology into the second P2P network topology to accommodate the third IHS.

9. The IHS of claim 8, wherein the first group of client IHSs comprises the second IHS, and wherein to restructure the first P2P network topology into the second P2P network topology, the program instructions, upon execution by the processor, further cause the first IHS to:
determine that the first count of P2P connected devices of the first group of client IHSs associated with the host has reached a threshold;
direct the second IHS to become a satellite host of a second group of client IHSs; and
wherein to direct the third IHS to join the P2P network, the program instructions, upon execution by the processor, further cause the first IHS to:
direct the third IHS to connect to the second IHS as the satellite host, and join the second group of client IHSs as an additional client.

10. The IHS of claim 9, wherein, after directing the second IHS to become the satellite host of the second group of client IHSs, the first group of client IHSs does not comprise the second IHS, and wherein the program instructions, upon execution by the processor, further cause the first IHS to:
obtain audio streams from individual IHSs of the first group of client IHSs;
merge audio streams from the first IHS and the first group of client IHSs into a first combined audio stream.

11. The IHS of claim 1, wherein the first IHS is configured as a host of a first group of client IHSs, wherein the second IHS is configured as a satellite host of a second group of client IHSs, and wherein the first group of client IHSs use a different frequency channel for communication than the second group of client IHSs.

12. The IHS of claim 1, wherein the first IHS is configured as a host of a first group of client IHSs comprising the second IHS, and wherein the program instructions, upon execution by the processor, further cause the first IHS to:
determine that a count of P2P connected devices of the first group of client IHSs associated with the host has not reached a threshold; and
advertise the P2P network, wherein the advertisement comprises metadata indicating that there is an open slot for an additional client.

13. A method comprising:
establishing, by a first Information Handling System (IHS), a peer-to-peer (P2P) connection with a second IHS of a P2P network, wherein the first IHS is configured as a host of the P2P connection;
obtaining, by the first IHS, a request to join the P2P network from a third IHS;
in response to the request, reconfiguring a topology of the P2P network to produce a reconfigured P2P network; and
directing, by the first IHS, the third IHS to join the reconfigured P2P network.

14. The method of claim 13, wherein the first IHS is configured as the host of a first group of client IHSs in the P2P network and the reconfigured P2P network, the method further comprising:
obtaining, by the first IHS, audio streams from individual IHSs of the first group of client IHSs; and
merging audio streams from the first IHS and the first group of client IHSs into a first combined audio stream.

15. The method of claim 13, wherein the first IHS is configured as the host of a first group of client IHSs in the P2P network and the reconfigured P2P network, and wherein directing the third IHS to join the reconfigured P2P network further comprises:
determining that a first count of P2P connected devices of the first group of client IHSs has reached a threshold;
determining that a second count of P2P connected devices of a second group of client IHSs associated with a satellite host has not reached the threshold; and
directing the third IHS to connect to the satellite host, and join the second group of client IHSs as an additional client.

16. The method of claim 13, wherein the first IHS is configured as the host of a first group of client IHSs in the P2P network and the reconfigured P2P network, wherein the first group of client IHSs comprises the second IHS, and wherein directing the third IHS to join the reconfigured P2P network further comprises:
determining that a count of P2P connected devices of the first group of client IHSs has reached a threshold;
directing the second IHS to become a satellite host of a second group of client IHSs; and
directing the third IHS to connect to the second IHS as the satellite host, and join the second group of client IHSs as a client.

17. One or more non-transitory computer-readable storage media storing program instructions, that when executed on or across one or more processors of a first Information Handling System (IHS), cause the first IHS to:
establish a peer-to-peer (P2P) connection with a second IHS of a P2P network, wherein the first IHS is configured as a host of the P2P connection, and wherein the P2P network is configured in a first P2P network topology;
obtain a request to join the P2P network from a third IHS; and
direct the third IHS to join the P2P network, wherein the P2P network is configured in a second P2P network topology.

18. The one or more non-transitory computer-readable storage media of claim 17, wherein the first IHS is configured as the host of a first group of client IHSs in the first and second P2P network topologies, and wherein the program instructions further cause the first IHS to:

obtain audio streams from the first IHS and individual IHSs of the first group of client IHSs; and merge audio streams from the first IHS and the first group of client IHSs into a first combined audio stream.

19. The one or more non-transitory computer-readable storage media of claim 17, wherein the first IHS is configured as the host of a first group of client IHSs in the first and second P2P network topologies, and wherein to direct the third IHS to join the P2P network, the program instructions further cause the first IHS to:

determine that a first count of P2P connected devices of the first group of client IHSs has reached a threshold;

determine that a second count of P2P connected devices of a second group of client IHSs associated with a satellite host has not reached the threshold; and direct the third IHS to connect to the satellite host, and join the second group of client IHSs as an additional client.

20. The one or more non-transitory computer-readable storage media of claim 17, wherein the first IHS is configured as the host of a first group of client IHSs in the first P2P network topology, and wherein to direct the third IHS to join the P2P network, the program instructions further cause the first IHS to:

determine that count of P2P connected devices of the first group of client IHSs associated with the host has reached a threshold;

direct the second IHS to become a satellite host of a second group of client IHSs; and direct the third IHS to connect to the second IHS as the satellite host, and join the second group of client IHSs as a client.

* * * * *